United States Patent Office 3,840,553
Patented Oct. 8, 1974

3,840,553
ADJUVANT COMPOSITIONS FOR DRILLING FLUIDS AND DRILLING FLUIDS CONTAINING SAME
Jean Neel and Louis Gelpi, Lyon, and Raymond Broc, Voisins-le-Bretonneux, France, assignors to Rhone-Progil, Paris, France
No Drawing. Filed Jan. 26, 1972, Ser. No. 221,081
Claims priority, application France, Jan. 26, 1971, 7103508
Int. Cl. C07d 49/34; C10m 1/32
U.S. Cl. 260—309.6          9 Claims

ABSTRACT OF THE DISCLOSURE

An emulsifier and filtrate loss reducer additive for drilling fluids of the water in oil type is obtained by mixing a polyhydroxy phenol with specified imidazolines such as amino-ethyl-1-heptadecenyl-2-imidazoline.

BACKGROUND OF THE INVENTION

The present invention relates to novel additive compositions useful as emulsifiers and filtrate reducers in reverse emulsion drilling fluids, that is, drilling fluid compositions of the water in oil emulsion type. The invention also relates to reverse emulsion drilling fluid compositions containing the novel additives, which compositions are particularly suitable for drilling at both mean and greater depths, especially in zones having creeping and water swollen clays.

It is known that, in the drilling of petroleum or natural gas wells by a rotary drilling process, a drilling fluid commonly called mud is used primarily to ensure removing the cuttings formed at the working face of the drill. This fluid which is introduced under pressure down through the drill string stem passes through the drill head, and then is forced upwardly through the annular space defined by the outer surface of the drill string and the inner surface of the drilled hole. The drilling fluid simultaneously performs other functions including cooling the drilling head, improving well wall tightness, and maintaining internal pressure equilibrium by means of hydrostatic pressure.

Three kinds of drilling fluids or muds are known, that is, fluids based upon water, fluids based upon oils, and emulsions of an aqueous phase in a continuous oily phase which are known as reverse emulsions. Each of these types of drilling fluids have some disadvantages associated with their use. Aqueous muds, under the influence of pressure differences, let water filter through geological layers which decreases the well wall resistance and may result in crumbling of the wall. Moreover, the passage of filtration water, which is commonly called filtrate, into zones containing petroleum is prejudicial to recovering the petroleum. Also, water loss from the drilling fluid or muds causes a generally detrimental modification of the rheological properties of the muds. Oil based fluids are less subject to filtration problems because the oil due to its viscosity flows less easily into subterranean formations. However, oil based fluids are extremely sensitive to contamination by water and by various compounds such as salt, calcium compounds, etc. and for these reasons their use in the petroleum industry has been limited. Reverse emulsions tend to be unstable, especially at the high temperatures which are generally found in deep wells, and this sets into being the problems inherent to aqueous phase filtration into the subterranean formations. In the past, efforts have been made to cope with these disadvantages by using various emulsifiers, especially polyamidoamines and imidazolines, associated with known compounds intended for reducing the amount of aqueous filtrate, such as tall oil, naphthenic acids, and lecithins. However, there is still considerable room for improvement with regard to such compositions.

SUMMARY OF THE INVENTION

It is a primary object of the present invention to provide novel additives useful in improving the stability and filtrate loss properties of drilling fluids of the water in oil emulsion type. In accordance with the present invention, there has been found new adjuvant compositions for use in drilling fluids of the water in oil type which compositions perform simultaneously as emulsifiers and as filtrate loss reducers, and give the drilling fluids excellent stability even at high temperatures and a practically non-existent aqueous phase filtration capacity. The adjuvant compositions are obtained by mixing a polyhydroxy phenol and a substituted imidazoline, each as hereinafter defined, and adding the resulting compositions to a reverse emulsion drilling fluid.

DETAILED DESCRIPTION OF THE INVENTION

The novel adjuvant compositions of the invention are obtained by mixing a polyhydroxy phenol with a heterocyclic amine having the formula:

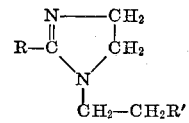

in which R may be an alkyl or alkenyl radical containing 12 to 30 and preferably 16 to 20 carbon atoms, or a saturated or unsaturated cyclic residue containing 5 to 20 carbon atoms; and R' is —$NH_2$ or —OH. In the present application, these amines will be referred to generically as imidazolines.

The imidazolines used in the invention are known compounds and are generally obtained by the reaction of diethylene triamine or aminoethyl-ethanolamine with a suitable acid such as oleic acid, stearic acid, tallow fatty acids, naphthenic and resin acids, tall oil, etc. The substituents R in the above formula thus include hydrocarbon residues from the aforementioned acids, and representative substituents include heptadecenyl, heptadecyl, cyclohexyl, and homologs. Abietyl mixtures of said imidazolines may also be used.

The polyhydroxy phenols useful in the invention include any mono- or polynuclear aryl compounds having at least two hydroxyl groups and which also may have alkyl substituents. By way of example and not by way of limitation, there may be used pyrocatechol, hydroquinone, resorcinol, pyrogallol, phloroglucinol, methyl- or ethyl-pyrocatechol, etc. It is also possible to use raw materials containing important quantities of polyhydroxy phenols or mixtures thereof, for example, coal tar distillation residues rich in methyl catechins, byproducts of pyrocatechol production by means of chlorophenol saponification, byproducts of chlorophenol alkaline melting, etc. Although all materials falling within the scope of the above definition are suitable, diphenols and alkyl diphenols in which the hydroxyl groups are in either 1,2- or 1,4-positions give particularly satisfactory results. Applicants' research has established that no special conditions are required to mix the two components since mere stirring of a polyhydroxy phenol and an imidazoline as defined hereinabove gives rise to a reaction resulting in an increase in the temperature of the mixture. A polyhydroxy phenol which is in a solid state, or a pasty state if a raw material is employed, is easily dissolved in liquid imidazoline. The reaction may be favored by moderate heating of the mixture, up to about 100° C. While applicants do not wish to be bound by the veracity of any theory, it is believed that an amine salt is formed when the substituent on the nitrogen atom of the imidazoline is an amino-ethyl radical.

The relative quantities of polyhydroxy phenol and imidazoline may vary within wide limits, for example, between 10 and 50 preferably 20 to 40 parts by weight of the phenolic compound for 90 to 50, preferably 80 to 60 parts by weight of the imidazoline.

The additive compositions of the invention may be introduced into drilling fluids in two different ways. According to the first method, the additive composition is initially prepared by mixing the two constituents. Then the reaction product is dispersed in the oily phase of a reverse emulsion drilling fluid. According to the second method, the additive compositions may be prepared within the drilling fluid itself by adding the polyhydroxy phenol and imidazoline components to this fluid.

For special applications particularly when the drilling fluids must be used under very difficult operating conditions due to the nature of the clay or especially high temperatures; it may be useful to also add to the drilling fluids filtrate reducers of known types such as fatty acids, and especially fatty acids based upon suint, olefin, resin acids, metal soaps of those salt, tall oil, lecithins, etc. The amount of polyhydroxy phenol-imidazoline composition added to the drilling muds are generally about 1 to 10 and preferably about 1 to 5 parts by weight per 100 parts by volume of the oily and aqueous phases. When conventional filtrate reducers are also used, the quantity of these optional additives is generally lower than the amount of the novel additive of the invention and varies, for example, between 0.5 and 5 parts by weight per 100 parts by volume of the oily and aqueous phases.

Drilling fluids of the reverse emulsion type have an oily phase and an aqueous phase and, in addition to the previously described novel additive compositions of the invention and possibly also known filtrate reducers discussed above, they may also contain conventional adjuvants such as basic compounds, ballasting materials, etc. The oily phase is constituted by any hydrocarbon oil of sufficient density with the density generally being between 0.8 and 0.9 grams per cc. Suitable oils comprise gas oil, fuel oils, kerosene, diesel oils, crude oil and the like. The aqueous phase may be formed merely by water or preferably by an aqueous solution of sodium chloride or any brine containing calcium chloride and possible other salts of alkaline earth metals. The quantity of water in the aqueous phase is determined with regard to the initial quantity of oil, and the ratio of water to oil based on the respective volumes may vary between large limits such as 50:50 to 10:90.

As indicated above, it may be advantageous to add to the reverse emulsion a basic compound especially quick lime or slaked lime which increases the pH of the fluid and improves its stability. The emulsion may also contain customary fillers such as finely divided barium sulphate, calcium carbonate, clay or other known ballasting materials which give the drilling fluid the desired density.

In preparing these drilling fluids, the aqueous phase is added to the oily phase which may contain the adjuvant compositions of the invention, and a reverse emulsion is formed by stirring the mixture for a suitable time. The basic compounds and known filtrate reducers, if they are used, are incorporated at any stage of the preparation of the drilling fluid, that is, either before or after emulsion formation. Fillers are generally added at the end of the operation.

The following examples given in a non-limitative way, list the characteristics and emphasize the excellent performances of drilling fluids containing adjuvant compositions according to the invention. In order to place these fluids in practical use conditions, they were stirred in rotating stoves at various temperatures. The apparent and plastic viscosities which appear in these examples, the shearing stress called "yield value," initial gel ($gel_0$), and 10 minutes gel ($gel_{10}$) strengths were evaluated by means of a Fann viscosimeter (made by Instrument Corporation, Houston, Tex. at the temperature of 60° C. Emulsion stability was evaluated by breaking voltage measured at 60° C. in a test consisting of immersing in the emulsion two electrodes 12 millimeters apart on which is applied an alternative current until current passed between those electrodes. Filtrates were determined on press-filter HPHT (high pressure, high temperature) under a pressure of 35 kg./cm.$^2$ at various temperatures, according to the standardized method of American Petroleum Institute (A.P.I.). Parts and percentages are expressed by weight except where otherwise indicated.

EXAMPLE 1

An adjuvant composition was prepared by dissolving 30 parts of a coal tar distillation residue known under the trademark of Brenzol and containing about 30% of pyrocatechol, 60% of methylpyrocatechol and 10% of various phenolic products in 70 parts of aminoethyl-1-heptadecenyl-2-imidazoline, and stirring the mixture for 30 minutes at 80° C.

20 parts of the composition obtained in this way was incorporated into 570 parts by volume of fuel oil, 400 parts by volume of a saturated brine containing 234 g./l. of sodium chloride, and 126 g./l. of calcium chloride. Then 40 parts of quick lime and lastly 360 parts of barium sulfate were added. This mud preparation was made while stirring for the total time of one hour. At this stage a series of tests which will appear in the table hereinafter were made on this mud which had a density of 1.27. Then the mud was stirred for 15 hours in a rotating stove at 95° C. and a new series of tests were made. Thereafter clay was added to the mud to obtain a density of 1.35 and this final product was submitted to a third series of tests. All of the test results are given in Table 1 below.

TABLE 1

|  | Mud without clay | | Mud with clay |
|---|---|---|---|
|  | After preparation | After stirring in stove |  |
| Apparent viscosity (cp.) | 18 | 18 | 30 |
| Plastic viscosity (cp.) | 19 | 19 | 28 |
| Yield value | 1 | 1 | 3 |
| Gel 0 | 1 | 1 | 2 |
| Gel 10 | 2 | 2 | 4 |
| Filtrate after 30 minutes (cm.$^3$ of oil) at— | | | |
| 90° C | | 1.3 | 1.7 |
| 120° C | | 1.9 | 6 |
| 150° C | | 5 | |
| Breaking voltage (volts) | 230 | 400 | 190 |

These results emphasize the mud's excellent characteristics and especially its great stability and the low quantity of filtrate which was constituted only by oil.

EXAMPLE 2

The previous example was reproduced, but using this time as an additive 20 parts of the product obtained by reacting 25 parts of methylpyrocatechol with 75 parts of aminoethyl-1-heptadecenyl - 2 - imidazoline. Moreover, after clay addition, the mud was again stirred for 15 hours in a rotating stove at 95° C. The drilling fluids characteristics appear in Table 2 hereinafter.

TABLE 2

|  | Mud after stove stirring | |
|---|---|---|
|  | Before clay addition | After clay addition |
| Apparent viscosity (cp.) | 18 | 28 |
| Plastic viscosity (cp.) | 17 | 25 |
| Yield value | 3 | 3 |
| Gel 0 | 1 | 2 |
| Gel 10 | 3 | 3 |
| Filtrate after 30 minutes (cm.$^3$ of oil) at— | | |
| 120° C | 1 | 1.3 |
| 150° C | 2.5 | 3 |
| Breaking voltage (volts) | 340 | 290 |

EXAMPLE 3

An additive was prepared using 40 parts of Brenzol and 60 parts of aminoethyl-1-heptadecenyl-2-imidazoline. 30 parts of the resulting product was added to 570 parts by volume of fuel oil. Then a reverse emulsion was formed by adding while stirring 440 parts by volume of a brine saturated with sodium and calcium chlorides. At last 10 parts of slaked lime and 1500 parts of barium sulfate were added. The mud had a density of 1.80. After making some tests the mud was stirred for 15 hours in a rotating stove at 95° C., then it was tested again. The results appear in Table 3 hereinafter.

TABLE 3

|  | Mud before stirring in stove | Mud after stirring in stove |
|---|---|---|
| Apparent viscosity (cp.) | 52.0 | 48.0 |
| Plastic viscosity (cp.) | 45 | 47 |
| Yield value | 15 | 3 |
| Gel 0 | 1 | 1 |
| Gel 10 | 7 | 4 |
| Filtrate after 30 minutes (cm.³ of oil) at— |  |  |
| 120° C. |  | 1.2 |
| 150° C. |  | 1.7 |
| 170° C. |  | 3.6 |
| Voltage breaking (volts) | 280 | 300 |

EXAMPLE 4

A drilling mud was produced according to the procedure of Example 1, and filled with barium sulfate to a density of 1.80. To this mud was also added 6 parts of a known type of filtrate reducer based upon fatty acids and comprising 80% of oil-tannage moellon and 20% of suint. The resulting mud was stirred for 15 hours in a rotating stove at 120° C., and some of its characteristics were determined. Thereafter 225 g./l. of clay were added and a new series of tests were made, and the results obtained by these tests appear in Table 4 hereinafter.

TABLE 4

|  | Mud without clay after in stove stirring | Mud with clay |
|---|---|---|
| Apparent viscosity (cp.) | 46 | 100 |
| Plastic viscosity (cp.) | 43 | 55 |
| Yield value | 5 | 20 |
| Gel 0 | 2 | 5 |
| Gel 10 | 5 | 13 |
| Filtrate after 30 minutes (cm.³) at— |  |  |
| 120° C.: |  |  |
| Oil | 1.6 |  |
| Emulsion | 0 |  |
| 150° C.: |  |  |
| Oil | 2.8 | 4 |
| Emulsion | 0 | 0 |
| 175° C.: |  |  |
| Oil | 2.5 | 7 |
| Emulsion | 0.2 | 0.5 |
| 200° C.: |  |  |
| Oil | 8.5 |  |
| Emulsion | 4.5 |  |
| Voltage breaking (volts) | >460 | 250 |

EXAMPLE 5

An emulsifier and filtrate reducer has been prepared by reacting 30 parts of Brenzol with 70 parts of the previous examples' imidazoline. 30 parts of the product obtained in this way were added to 570 parts by volume of fuel oil; 440 parts by volume of a mixed saturated NaCl-CaCl₂ brine were introduced while stirring, and at last 40 parts of quick lime and 360 parts of barium sulfate were incorporated. This mud was stirred in a rotating stove at 95° C. for 15 hours and then brought to a density of 1.35 by clay addition. This final mud was kept in a rotating stove at 90° C. for 20 hours.

As a comparison, an identical mud was made but the additive according to the invention was replaced by 30 parts of a known type emulsifier having a polyamidoamine structure, and 20 parts of a filtrate reducer based upon fatty acids. The same series of tests as in the previous examples were made on those two muds. The obtained results are given in Table 5 hereinafter.

TABLE 5

|  | Muds not filled with clay after stirring in stove | | Muds filled with clay after stirring in stove | |
|---|---|---|---|---|
|  | Mud according to invention | Mud according to prior art | Mud according to invention | Mud according to prior art |
| Apparent viscosity (cp.) | 18 | 18 | 30 | 24 |
| Plastic viscosity (cp.) | 19 | 17 | 27 | 22 |
| Yield value | 1 | 1 | 5 | 3 |
| Gel 0 | 1 | 1 | 2 | 1 |
| Gel 10 | 2 | 2 | 4 | 2 |
| Filtrate after 30 minutes (cm.³) at— |  |  |  |  |
| 120° C.: |  |  |  |  |
| Oil | 1.1 | 1.0 | 1.1 | 1.0 |
| Emulsion | Traces | Traces | 0 | 0 |
| Water | 0 | 0 | 0 | 0 |
| 150° C.: |  |  |  |  |
| Oil | 2.8 | 10.4 | 3.5 | 16.5 |
| Emulsion | 0 | 6.6 | 0 | Traces |
| Water | 0 | 5 | 0 | 1.4 |
| Voltage breaking (volts) | 300 | 150 | 200 | 150 |

The figures hereinabove emphasize clearly the superiority of the muds obtained according to invention with regard to stability and filtrate loss at high temperature.

EXAMPLE 6

Three types of mud were prepared starting from 540 parts by volume of fuel oil, 480 parts (vol.) of a mixed saturated brine NaCl and CaCl₂, 40 parts of quick lime and 380 parts of barium sulfate.

In the first mud, 15 parts of aminoethyl-1-heptadecenyl-2-imidazoline and 21 parts of fatty acids mixture based upon suint and olein (additives according to the prior art) were added to the oil phase.

In the second mud, the same imidazoline as in the first mud was added in the same proportions, and also 6 parts of Brenzol.

In the third mud, besides the imidazoline, 15 parts of a mixture containing 75% of fatty acids and 25% of Brenzol were added.

These three drilling fluids were each stirred in a rotating stove at 120° C. for 15 hours, and then the same tests as in the previous examples were made. The results are given in Table 6 hereinafter.

TABLE 6

|  | After stirring in stoves | | |
|---|---|---|---|
|  | Mud I | Mud II | Mud III |
| Apparent viscosity (cp.) | 18 | 20 | 19 |
| Plastic viscosity (cp.) | 18 | 20 | 19 |
| Yield value | 1 | 1 | 1 |
| Gel 0 | 2 | 1 | 2 |
| Gel 10 | 2 | 2 | 3 |
| Filtrate after 30 minutes (cm.³) at 120° C.: | | | |
| Oil | 9.2 | 1.2 | 2.1 |
| Emulsion | 4.8 | 0 | 0.1 |
| Water | Traces | 0 | 0 |
| Breaking voltage (volts) | 225 | 280 | 180 |

EXAMPLE 7

Two drilling fluids were prepared from 540 parts by volume of fuel oil, 480 parts by volume of a mixed brine of sodium and calcium chlorides, and 40 parts of quick lime. 15 parts of aminoethyl-1-heptadecyl-2-imidazoline and 21 parts of a fatty acid mixture based upon olein and suint were introduced into the first oily phase. In the second fluid, besides the 15 parts of imidazoline, 12 parts of a mixture with 50% of tall oil and 50% of methyl-pyrocatechol were added.

These two fluids were kept in a rotating stove at 90° C. for 15 hours, and then they were submitted to series of tests the results of which are given in Table 7 hereinafter.

TABLE 7

|  | Fluid 1— After stirring in stove | Fluid 2— After stirring in stove |
|---|---|---|
| Apparent viscosity (cp.) | 12.5 | 13 |
| Plastic viscosity (cp.) | 10 | 11 |
| Yield value | 1 | 1 |
| Gel 0 | 1 | 1 |
| Gel 10 | 2 | 2 |
| Filtrate after 30 minutes (cm.³) at 120° C.: | | |
| Oil | 10 | 2.3 |
| Emulsion | 20 | 0.1 |
| Water | 0 | 0 |
| Breaking voltage (volts) | 100 | >460 |

It has also been observed that when the fatty acids mixture based upon olein and suint of the first fluid were replaced by an equivalent or greater quantity of naphthenic acids, the filtrate quantity still increased with regard to the above mentioned data for fluid 1.

EXAMPLE 8

14 parts of hydroxyethyl-1-heptadecenyl-2-imidazoline, and then 20 parts of a mixture with 40% of Brensol, 40% of tall oil and 20% of suint were added to 570 parts in volume of fuel oil. Then 440 parts by volume of a saturated brine based upon calcium and sodium chlorides, 40 parts of quick lime, and 360 parts of barium sulfate were added. This mud was stirred in a rotating stove at 95° C. for 15 hours, submitted to tests and then filled with clay up to a density of 1.37, after which a new series of measures were made. The obtained results are given in Table 8 hereinafter.

TABLE 8

|  | Mud not filled with clay (after stirring) | Mud with clay |
|---|---|---|
| Apparent viscosity (cp.) | 20 | 28 |
| Plastic viscosity (cp.) | 19 | 24 |
| Yield value | 2 | 6 |
| Gel 0 | 2 | 2 |
| Gel 10 | 3 | 4 |
| Filtrate after 30 minutes (cm.³ of oil) at— | | |
| 90° C | 1.3 | 1 |
| 120° C | 1.2 | 1.5 |
| 150° C |  | 2 |
| Breaking voltage (volts) | 300 | 170 |

While presently preferred embodiments of the invention have been shown and described with particularity, it will be appreciated that various changes and modifications may readily suggest themselves to those of ordinary skill in the art upon being apprised of the present invention. It is intended to encompass all such changes and modifications as fall within the scope and spirit of the appended claims.

What is claimed is:

1. A composition useful as an emulsifier and as a filtrate loss reducer in a drilling fluid of the water-in-oil type, said composition consisting essentially of the reaction product formed by reacting, at temperatures of up to about 100° C., (1) from 10 to 50 parts by weight, based on the weight of the composition, of a polyhydroxy phenol comprising a mononuclear phenol substituted only with at least two hydroxy groups or a mononuclear phenol substituted only with at least two hydroxy groups and alkyl groups; and (2) correspondingly, from 90 to 50 parts by weight, based on the weight of the composition, of an imidazoline of the formula:

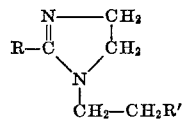

wherein R is an alkyl or alkenyl group containing from 12 to 30 carbon atoms or a saturated or unsaturated hydrocarbon residue of a cyclic acid containing from 5 to 20 carbon atoms and wherein R' is an amino or hydroxyl group.

2. A composition according to Claim 1, wherein R is a saturated or unsaturated hydrocarbon residue of a cyclic acid selected from the group consisting of naphthenic acid and resin acid.

3. A composition according to Claim 1, wherein R' is hydroxyl.

4. A composition according to Claim 1, wherein R' is amino.

5. A composition according to Claim 1 wherein said polyhydroxy phenol is selected from the group consisting of pyrocatechol, hydroquinone, resorcinol, pyrogallol, phloroglucinol and methyl- or ethyl-pyrocatechol.

6. A composition according to Claim 1 wherein said polyhydroxy phenol is an alkyl substituted polyhydroxy phenol.

7. A composition according to Claim 1, wherein R is an alkyl or alkenyl group containing from 16 to 20 carbon atoms.

8. A composition according to Claim 7 wherein said polyhydroxy phenol is a dihydroxy phenol or an alkyl dihydroxy phenol wherein the hydroxyl groups are in either the 1,2- or 1,4-positions.

9. A composition according to Claim 8, consisting essentially of the reaction product formed by reacting, at temperatures of up to about 100° C., (1) from 20 to 40 parts by weight, based on the weight of the composition, of said polyhydroxy phenol and (2) correspondingly from 80 to 60 parts by weight, based on the weight of the composition, of said imidazoline.

References Cited

UNITED STATES PATENTS

| 3,639,233 | 2/1972 | Schultz et al. | 252—8.5 |
| 2,999,063 | 9/1961 | Hoeppel | 252—8.5 |
| 2,468,163 | 4/1949 | Blair et al. | 252—8.55 |

HERBERT B. GUYNN, Primary Examiner

U.S. Cl. X.R.

252—8.5 P